United States Patent
Cattoor et al.

(10) Patent No.: US 12,252,011 B2
(45) Date of Patent: Mar. 18, 2025

(54) DRIVELINE SYSTEM WITH HYDRAULIC COUPLING AND POWER TAKE-OFF (PTO) AND METHOD FOR OPERATION OF THE SYSTEM

(71) Applicant: Dana Belgium N.V., Flanders (BE)

(72) Inventors: Kurt Cattoor, Koolkerke (BE); Filip D. Schacht, Meulebeke (BE)

(73) Assignee: DANA BELGIUM N.V., Bruges (BE)

( * ) Notice: Subject to any disclaimer, the term of this patent is extended or adjusted under 35 U.S.C. 154(b) by 111 days.

(21) Appl. No.: 17/815,892

(22) Filed: Jul. 28, 2022

(65) Prior Publication Data

US 2024/0034147 A1    Feb. 1, 2024

(51) Int. Cl.
*B60K 17/28* (2006.01)
*B60K 17/02* (2006.01)
*B60K 17/10* (2006.01)

(52) U.S. Cl.
CPC .............. *B60K 17/28* (2013.01); *B60K 17/02* (2013.01); *B60K 17/10* (2013.01)

(58) Field of Classification Search
CPC ......... B60K 17/02; B60K 17/10; B60K 17/28
USPC .......................................... 74/11, 15.2, 15.4
See application file for complete search history.

(56) References Cited

U.S. PATENT DOCUMENTS

| | | | |
|---|---|---|---|
| 3,039,317 A | * | 6/1962 | Wilson ...................... F16H 1/02 74/504 |
| 9,765,826 B2 | | 9/2017 | Nishimoto |
| 2009/0114045 A1 | * | 5/2009 | Wilson ................... B60K 17/28 74/11 |
| 2015/0045184 A1 | | 2/2015 | Nishimoto |
| 2016/0129786 A1 | * | 5/2016 | Petersen ................ B60K 17/28 192/85.01 |
| 2016/0176288 A1 | * | 6/2016 | Kempf .................... B60K 17/28 74/11 |
| 2018/0178798 A1 | | 6/2018 | Peterson et al. |
| 2020/0282820 A1 | | 9/2020 | Waldner et al. |

* cited by examiner

*Primary Examiner* — T. Scott Fix
(74) *Attorney, Agent, or Firm* — McCoy Russell LLP

(57) ABSTRACT

A driveline system and driveline operating method are provided herein. In one example, the driveline system includes a hydraulic coupling designed to rotationally couple to a prime mover and an output interface designed to rotationally couple to a downstream driveline component, and a power take-off (PTO) assembly. The PTO assembly includes a first pump gear rotationally coupled to an input gear that is directly coupled to the output interface, where the first pump gear is designed to rotationally couple to a first pump via a first pump shaft interface and a first pump adapter designed to mount to the first pump.

19 Claims, 4 Drawing Sheets

DRIVELINE SYSTEM WITH HYDRAULIC COUPLING AND POWER TAKE-OFF (PTO) AND METHOD FOR OPERATION OF THE SYSTEM

TECHNICAL FIELD

The present disclosure relates to a driveline system with a hydraulic coupling and a power-take off (PTO) coupled to an output of the hydraulic coupling.

BACKGROUND AND SUMMARY

Certain powertrains include power take-offs (PTOs) such as hydraulic or mechanical PTOs to drive implements in the vehicle. The PTOs allows the vehicle's operational capabilities to be expanded and may be used in a wide variety of vehicle platforms.

US 2018/0178798 A1 to Peterson et al. teaches a PTO interface that is included at a bottom of a transmission. The PTO interface allows a PTO device to access the transmission and be power by a gear that meshes with a countershaft gear.

The inventors have recognized several drawbacks with Peterson's PTO transmission unit as well as other previous PTO systems. For instance, Peterson's PTO interface is incorporated into a transmission which increases the complexity and size of the transmission which may constrain its applicability. Further, other prior PTO systems have made use of PTO boxes that increase driveline complexity. Consequently, manufacturing of these PTO systems can be prolonged and costly.

The inventors have recognized the aforementioned issues and developed a driveline system to at least partially overcome issues. The drivelines system, in one example, includes a hydraulic coupling (e.g., a torque converter). The hydraulic coupling is designed to rotationally couple to a prime mover (e.g., an internal combustion engine or an electric motor). The hydraulic coupling includes an output interface designed to rotationally couple to a transmission. The hydraulic coupling further includes a PTO assembly with a first pump gear that is rotationally coupled to an input gear. Further in such an example, the input gear is directly coupled to the output interface of the hydraulic coupling. Additionally, the first pump gear is designed to rotationally couple to a first pump via a first pump shaft interface. The PTO assembly further includes a first pump adapter designed to mount to the first pump. In this way, the PTO assembly which expands the driveline's PTO capabilities is space efficiently incorporated into the driveline, thereby increasing the drivelines applicability.

Further in one example, the PTO assembly may include an idler gear meshing with the first gear and the first pump gear. In such an example, the PTO assembly may further include a second pump gear which is designed to rotationally couple to the first gear and rotationally couple to a second pump. The connection to the second pump is made via a second pump shaft interface and a second pump adapter that is designed to mount to the second pump. In this way, multiple PTOs may be effectively connected to the driveline at the hydraulic coupling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A driveline system with a power take-off (PTO) assembly space efficiently incorporated into a hydraulic coupling (e.g., torque converter) is described herein. The space efficiency gains achieved by the PTO design allows multiple PTO interfaces to be provided in a package that may be at least as compact as previous PTO systems with single stand-alone PTO boxes. To achieve the space efficient layout, the PTO assembly includes an input gear that is mounted on an output of the hydraulic coupling. Additionally, in the PTO assembly an idler gear may mesh with the input gear and one or more pump gears that are designed to interface with and drive hydraulic pumps. This PTO gearing may be enclosed within the hydraulic coupling housing to achieve the space efficient design.

Figure 1:
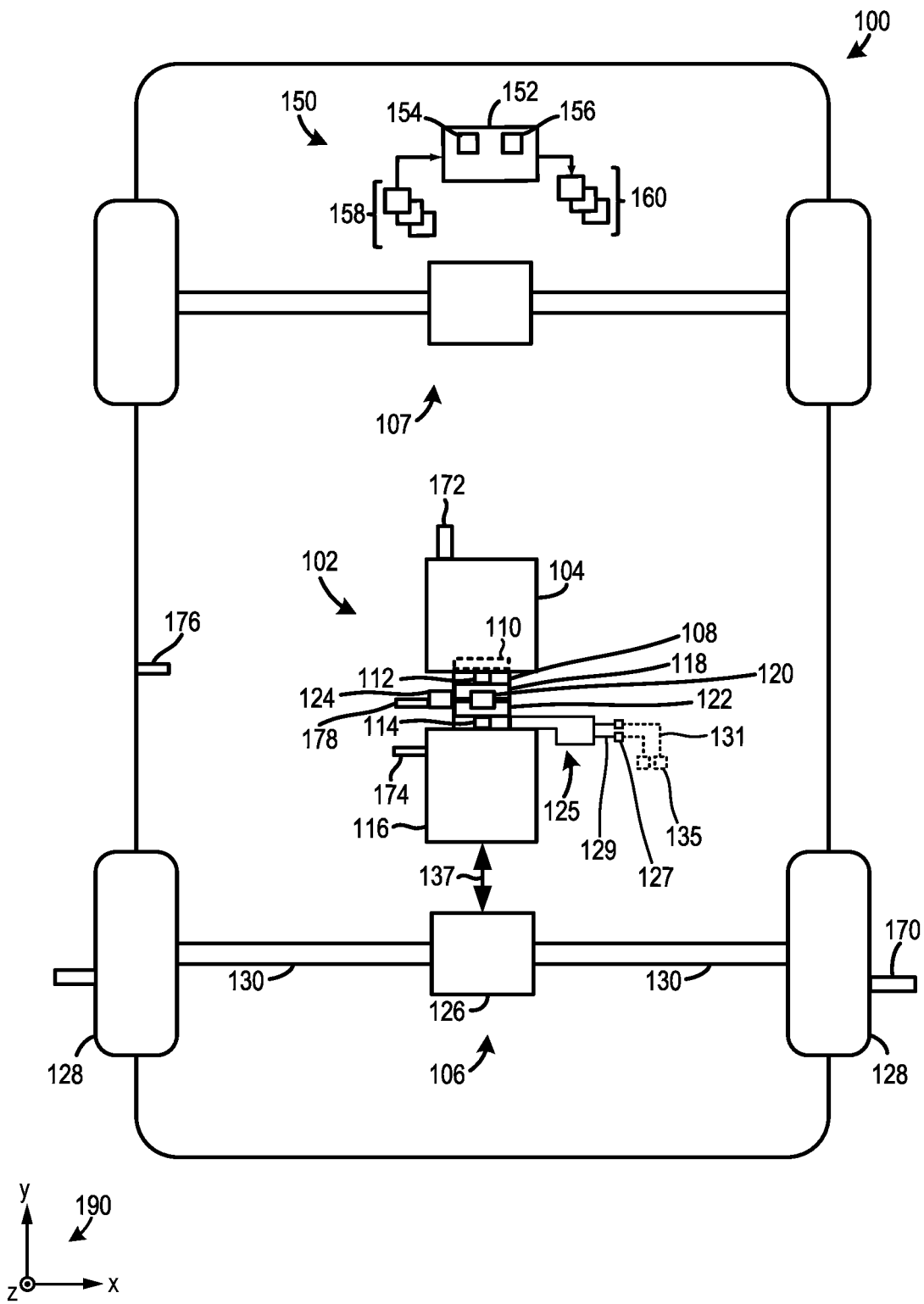
FIG. 1 is a schematic representation of a vehicle with a hydraulic coupling.

FIG. 1 shows a schematic depiction of a vehicle 100 with a powertrain 102 that includes a prime mover 104 (e.g., an internal combustion engine (ICE)) designed for compression and/or spark ignition, an electric motor, combinations thereof, and the like). As such, the vehicle may be an ICE vehicle that omits an electric motor, in one example, or alternatively, may be an electric vehicle (EV) which forgoes the engine. Still further, in other examples, the vehicle may be a hybrid vehicle that includes both a motor and internal combustion engine. The vehicle 100 may include a drive axle 106 and a non-drive axle 107 although numerous axle arrangements have been envisioned.

The powertrain 102 may further include a hydraulic coupling 108 (e.g., a torque converter) that is rotationally coupled to the prime mover 104. A flexplate 110 may be used to form the rotational attachment between the prime mover 104 and the hydraulic coupling 108. Alternatively, a flange connection may be used to attach the prime mover 104 to the hydraulic coupling 108. The hydraulic coupling 108 includes an input interface 112 and an output interface 114 that serve as attachment points for the prime mover 104 and a transmission 116, respectively. The interfaces in the hydraulic coupling may be any suitable attachment mechanism such as plates, shafts, flanges, combinations thereof, and the like.

The hydraulic coupling 108 hydraulically transfers power between the prime mover 104 and the transmission 116. Specifically, the hydraulic coupling may increase output torque during certain conditions. The hydraulic coupling 108 may include an impeller 118, stator 120, turbine 122, and the like to achieve the aforementioned torque gains. In the illustrated example, the hydraulic coupling 108 includes a lock-up clutch 124 designed to engage and disengage based on powertrain operating conditions. When engaged, the lock-up clutch holds the input and output of the hydraulic coupling at an equivalent rotational speed. Conversely, when disengaged, the lock-up clutch does not lock the input and output together and instead permits the hydraulic coupling to operate as a torque multiplier. Alternatively, in other examples, the lock-up clutch may not be used in the hydraulic coupling.

The powertrain 102 may further include a PTO assembly 125 incorporated into the hydraulic coupling 108. The PTO assembly 125 is designed to divert mechanical power from the output interface 114 of the hydraulic coupling to drive multiple hydraulic pumps 127, as illustrated. The PTO assembly 125 is schematically depicted in FIG. 1. However, it will be understood that the PTO assembly has greater structural complexity that is expanded upon herein with regard to the PTO assembly embodiment depicted in FIGS. 2-4. Pump shafts 129 or other suitable mechanical components allow for the connection between the PTO and the pumps. In turn, during powertrain operation, the pumps 127 deliver pressurized fluid to hydraulically operated implements 135. The hydraulically operated implements may include amongst others fixed gear pumps and variable displacement pumps. Hydraulic lines 131 facilitating fluidic communication between the pumps 127 and the implements 135 are further illustrated in FIG. 1.

The hydraulic coupling 108 is schematically illustrated in FIG. 1. Nevertheless, the hydraulic coupling has greater structural complexity that is described with regard to the hydraulic coupling embodiments illustrated in FIG. 2.

The transmission 116 may be a powersplit, powershift, or hydrostatic type transmission, in different examples. The powertrain 102 may further include a differential 126 that is rotationally coupled to the transmission 116. The differential 126 may also be connected to drive wheels 128 via axle shafts 130. Arrows 137 depict the power flow between the transmission 116 and the differential 126 during different operating conditions.

A control system 150 with a controller 152 may further be incorporated in the powertrain 102. The controller 152 includes a processor 154 and memory 156. The memory 156 may hold instructions stored therein that when executed by the processor cause the controller 152 to perform the various methods, control strategies, etc., described herein. The processor 154 may include a microprocessor unit and/or other types of circuits. The memory 156 may include known data storage mediums such as random access memory, read only memory, keep alive memory, combinations thereof, and the like. The components of the controller may be collocated, in one example, or dispersed between multiple controller units, in alternate examples.

The controller 152 may receive vehicle data and various signals from sensors 158 positioned in different locations in the powertrain 102 and/or the vehicle 100. The sensors may include wheel speed sensors 170, a prime mover speed sensor 172, a transmission input speed sensor 174, an ambient temperature sensor 176, a lock-up clutch position sensor 178, and the like.

Additionally, the controller 152 sends control commands to actuators 160 of controllable components such as the prime mover 104, the lock-up clutch 124, clutches in the transmission 116, and the like. In response to receiving the control commands, actuators in the controllable components may be used to adjust these components (e.g., engage/disengaged the lock-up clutch, adjust engine speed, etc.).

An axis system 190 is provided in FIG. 1, for reference. The z-axis may be a vertical axis (e.g., parallel to a gravitational axis), the x-axis may be a lateral axis (e.g., a horizontal axis), and/or the y-axis may be a longitudinal axis, in one example. However, the axes may have other orientations, in other examples.

Figure 2:
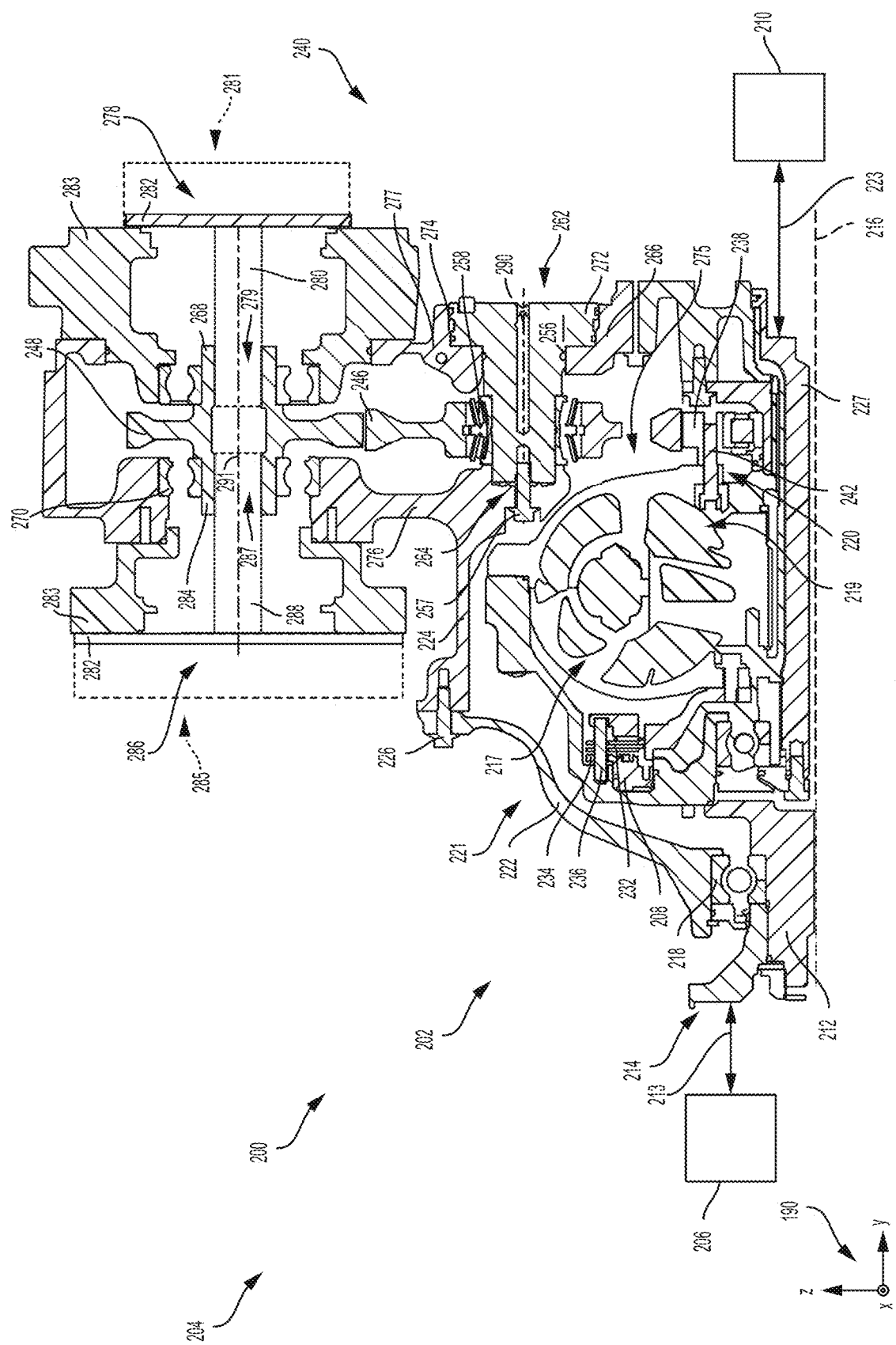
FIG. 2 depicts, in cross-section, an example of a driveline system with a hydraulic coupling and a power take-off (PTO) assembly.

Turning to FIG. 2, an example of a driveline system 200 is illustrated. The driveline system 200 may be included in the powertrain 102 shown in FIG. 1. As such, the functional and/or structural features of the hydraulic coupling 108 and other driveline components shown in FIG. 1, may overlap with the features of the hydraulic coupling 202 and the driveline components, shown in FIG. 2 or vice versa.

FIG. 2 depicts a driveline system 200. In the illustrated example, the driveline system 200 is incorporated into a powertrain 204 that includes a prime mover 206 (e.g., an internal combustion engine (ICE)), a hydraulic coupling 202 (e.g., torque converter) with a lock-up clutch 208, and a downstream driveline component 210 (e.g., an automatic transmission). Alternatively, the lock-up clutch may be omitted from the driveline system.

In the illustrated example, the hydraulic coupling 202 is a torque converter. However, other suitable hydraulic couplings may be used, in alternate examples. As illustrated, the hydraulic coupling 202 includes a flange 214 that functions as a mechanical connection between the hydraulic coupling 202 and a prime mover 206. Arrows 213 signify the mechanical connection between the hydraulic coupling 202 and the prime mover 206. This connection may be established via attachment devices, a shaft, combinations thereof, and the like that attach to a flange 214 of the input shaft 212. An axis 216 about which an input shaft rotates, as well as the other rotational components in the hydraulic coupling 202, is provided for reference.

The hydraulic coupling further includes an impeller 217 coupled to the input shaft 212 and a turbine 219 coupled to an output shaft 227 with an output interface 220. A bearing 218 (e.g., ball bearing, roller bearing, and the like) may be coupled to the input shaft 212 and a section 222 of a hydraulic coupling housing 221. As described herein, a bearing may include components such as roller elements, inner races, outer races, and the like to permit the bearing to constrain rotation of the component to which it is attached and provide support thereto. The hydraulic coupling 202 further includes the output interface that attaches to a downstream driveline component 210 that may be included in or rotationally coupled to a transmission, as previously discussed. The mechanical connection between the downstream driveline component 210 and the output interface 220 is denoted via arrows 223. This mechanical connection may include shafts, gears, joints, combinations thereof, and the like.

In the illustrated example, the housing 221 is a multi-section housing. The sections 222, 224 of the housing may be secured to one another using attachment devices 226. As described herein, an attachment device may include components such as bolts, screws, clamps, and the like to permit the housing to provide support thereto. The housing 221 is constructed in sections, in the illustrated example, to simplify PTO and hydraulic coupling component installation and removal, thereby increase installation and servicing efficiency. Further, the housing encloses the impeller 217 and the turbine 219, among other components.

A lock-up clutch 208 is further included in the hydraulic coupling 202, in the illustrated example. The lock-up clutch 208 includes friction plates 232, separator plates 234, and an actuation piston 236. The actuation piston 236 may be hydraulically actuated via hydraulic conduits routed thereto, in one example. However, in another example, the piston may be actuated using a solenoid or the lock-up clutch may be omitted from the hydraulic coupling.

The hydraulic coupling 202 is rotationally attached to an input gear 238 in a PTO assembly 240 of the driveline system 200. To elaborate, the input gear 238 is directly coupled to the output interface 220 of the hydraulic coupling 202. To elaborate, an attachment device 242 (e.g., bolt, screw, pin, and the like) may be used to attach the input gear 238 to the output interface 220. In other examples, the input gear 238 may be coupled to the output interface 220 via a weld joint, a monolithic construction, and the like. As described herein a gear is a rotating component that has teeth which are designed to mesh with teeth on an associated gear. The gears in the PTO assembly may have straight teeth, in one example. In such an example, the straight teeth may allow the loading on the bearings to be reduced. Alternatively, in other example, the gears in the PTO assembly may have helical teeth which may generate less noise, vibration, and harshness (NVH) when compared to other types of gear tooth cuts.

The PTO assembly 240 includes an idler gear 246 which meshes with the input gear 238 and a first pump gear 248, in the illustrated example. Thus, in the illustrated example, the input gear 238 is rotationally coupled to a first pump gear 248 by way of an idler gear 246. The idler gear may mesh with a second pump gear discussed in greater detail herein with regard to FIG. 4. However, in other examples, the idler gear may be omitted and the input gear 238 may mesh with the first pump gear 248. Still further in other examples another idler gear may be incorporated into the PTO assembly 240.

The first pump gear 248 is at least partially enclosed by the housing 221 and is positioned on an output side 275 of the hydraulic coupling, in the illustrated example. In this way, the compactness of the PTO assembly 240 is increased. However, the housing may have other contours in other examples.

The idler gear 246 is coupled to the idler shaft 256 via a bearing 258. The bearing 258 is illustrated as a double row tapered roller bearing. However, other suitable types of bearings (e.g., a ball bearing, a roller bearing, and the like) may be used to attach the idler gear to the idler shaft, in other embodiments. Further, the idler shaft 256 is supported by the housing 221 on opposing axial sides 262, 264. In this way, the housing function to enclose the hydraulic coupling components as well as provide support to the idler shaft on which the idler gear rotates. Using the idler gear in the PTO assembly creates more free space for pumps by moving the pump interface in the PTO assembly further away from the hydraulic coupling and the input shaft center line. As a result, larger pumps may be used in the PTO assembly, if desired.

The idler shaft 256 may be coupled to the second housing section 224 via a fastener 257 at a first axial end and/or other suitable attachment technique. In this way, the idler shaft is space efficiently incorporated into the hydraulic coupling. A second axial end of the idler shaft 256 is mated in a third section 266 of the housing 221. To elaborate, a flange 272 is mated in a recess of the third section 266 and a seal 274 may be used to seal the interface between the idler shaft and the hydraulic coupling housing.

The input gear 238 is at least partially contained within the housing 221. The first housing section 222 may at least partially surround an input side of the hydraulic coupling. However, the housing may have another suitable construction, in other examples. Further, as illustrated, the first housing section 222 exposes the input shaft 212. A third housing section 266 may at least partially encompass the idler gear 246 and the input gear 238. In this way, the PTO assembly may be efficiently incorporated into the hydraulic coupling.

The PTO assembly 240 further includes a pump gear shaft 268 that is fixedly coupled to the first pump gear 248. The pump gear shaft 268 and the other pump gear shafts described herein function as pump shaft interfaces and may be referred to as such. The first pump gear and the first pump shaft may be press-fit, welded, or machined out of a single piece of material, in different examples. As such, the first pump gear 248 and the pump gear shaft 268 co-rotate during PTO operation.

In the illustrated example, bearings 270 are coupled to the pump gear shaft 268. To expound, the bearings 270 are positioned on opposing axial sides of the first pump gear 248.

To enclose the idler gear 246 and the first pump gear 248, an extension 276 of the second housing section 224 and an extension 277 of the third housing section 266 are arranged on opposing axial sides of the gears, in the illustrated example. The extension 276 has one of the bearings 270 mounted therein. However, other housing contours have been contemplated.

The PTO assembly 240 further includes a first pump adapter 278 and a second pump adapter 286. The first pump adapter 278 may include an opening 279 in the pump gear shaft 268. Likewise, the second pump adapter 286 includes an opening 287 in the pump gear shaft 284. The openings may be sized and otherwise contoured (e.g., splined) to accept hydraulic pump shafts 280, 288 in hydraulic pump 281, 285 which are schematically illustrated in FIG. 2. As such, the PTO may be attached to multiple pumps. However, in other examples, the PTO may be designed to attach to a single pump.

The first pump adapter 278 includes mounting flanges 283 that enable the pump 281 to be mounted thereto. Covers 282 may be coupled to the flanges 283 and removed after shipping. The flanges 283 of the pump adapter 278 extend between the covers 282 and the bearings 270. In this way, the first pump adapter 278 at least partially encloses the first pump gear 248. In this way, the components within the PTO are protected and lubricant may be contained within the PTO, if so desired. Further, one of the flanges 283 of the first pump adapter 278 is coupled to the extension 276 of the second housing section 224, in the illustrated example. In this way, the PTO assembly is efficiently incorporated into the hydraulic coupling while allowing the pump adapter to effectively receive the hydraulic pump shaft 280.

A portion of first pump adapter 278 is positioned outward from the second housing section 224. To elaborate, the mounting flange is positioned outward from a section of the housing that encloses the impeller 217 and the turbine 219. In other words, a portion of the first pump adapter 278 axially overlaps a section of the hydraulic coupling 202 that includes the impeller 217 and the turbine 219. In this way, the compactness of the PTO and hydraulic coupling arrangement is increased. However, in other examples, the flange may be positioned in another suitable location.

Figure 3:
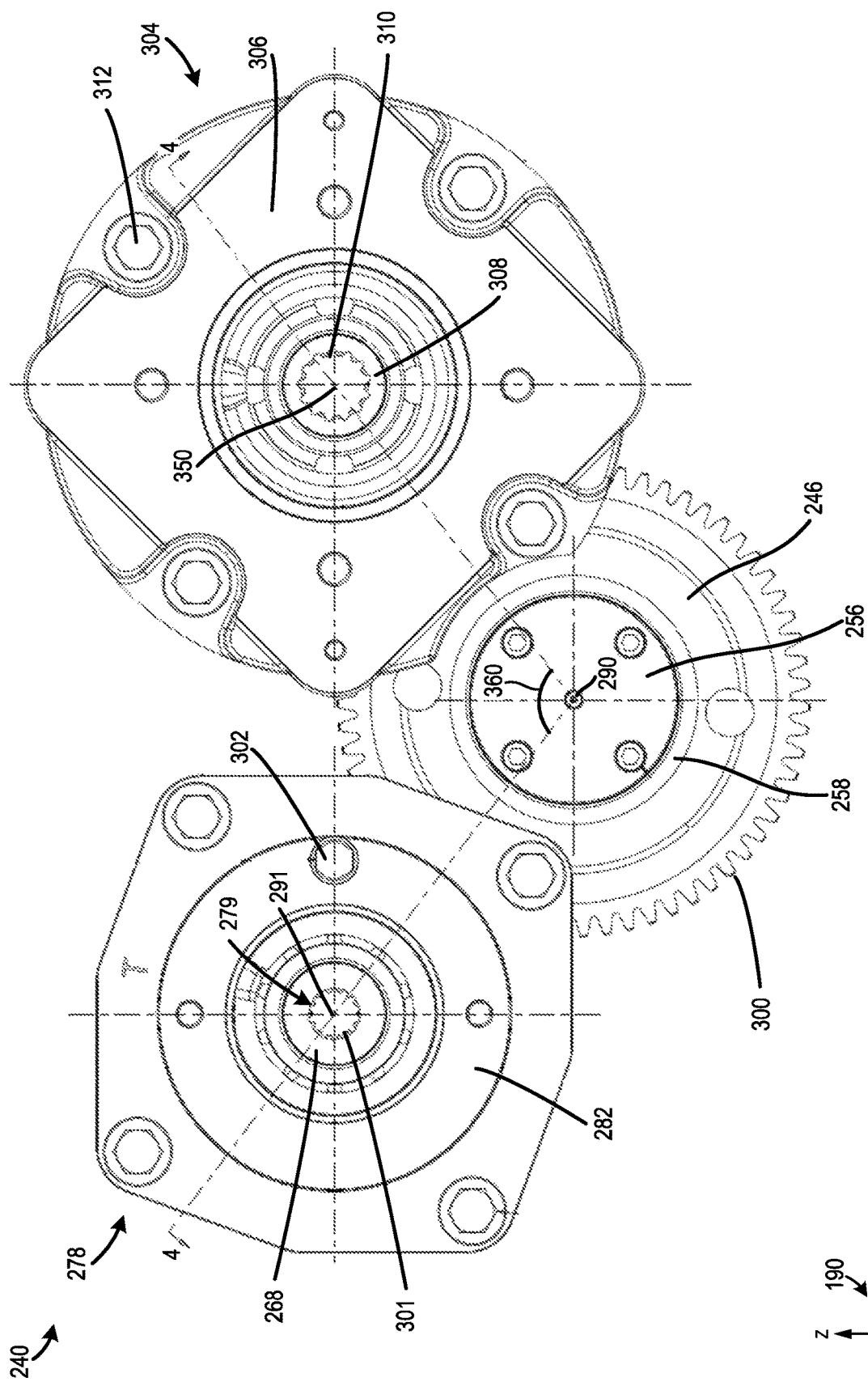
FIG. 3 depicts a side view of the PTO assembly, illustrated in FIG. 2.
Figure 4:
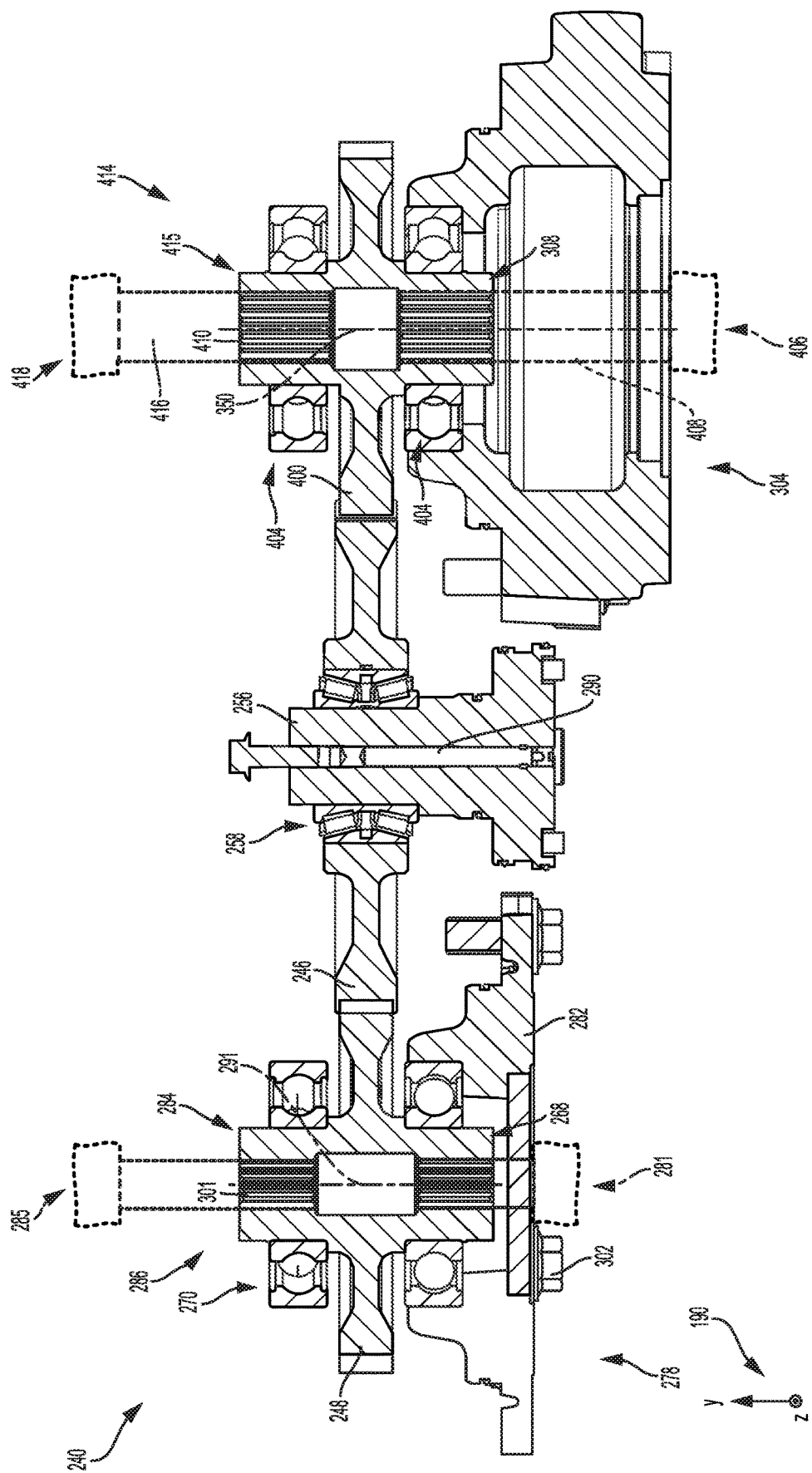
FIG. 4 depicts another cross-sectional view of the PTO assembly, illustrated in FIG. 2.

Rotational axes 290 and 291 of the idler shaft 256 and the pump gear shaft 268 are further provided for reference in FIG. 2 as well as FIGS. 3-4. It will be appreciated that the rotational axis 291 of the pump gear shaft 268 is coaxial to rotational axis of the hydraulic pump shaft 280.

FIG. 3 shows a side view of the PTO assembly 240. The idler gear 246, the idler shaft 256, and the bearing 258. Teeth 300 of the idler gear 246 are further shown. As previously indicated, the idler gear teeth mesh with the first pump gear 248, shown in FIG. 2, and a second pump gear 400, shown in FIG. 4. The first pump gear 248 corresponds to the first pump adapter 278. The opening 279 in the pump gear shaft 268 is additionally depicted. The opening 279 includes a spline 301 designed to mate with a spline in a pump gear shaft. One of the flanges 283 in the first pump adapter 278 is further shown. Fasteners 302 may be used to attach the hydraulic pump to the first pump adapter.

A third pump adapter 304 is included in the PTO assembly 240, in the illustrated example. However, in other examples, the third pump adapter 304 may be omitted from the PTO assembly. The third pump adapter 304 includes a flange 306 (e.g., mounting plate) that allows a third hydraulic pump to be coupled thereto. A second pump gear shaft 308 with a spline 310 is further shown in FIG. 3. Fasteners 312 may be used to secure the second pump to the third pump adapter 304. A rotational axis 350 of the second pump gear shaft 308 is depicted in FIG. 3 and FIG. 4 for reference.

An angle 360 is further depicted in FIG. 3. The angle 360 is formed between lines that extend from the rotational axis 290 of the idler shaft 256 to the rotational axes 291 and 350 of the pump gear shaft 268 and the pump gear shaft 308, respectively. The angle 360 may be greater than or equal to 45° in one example. In this way, pumps of desired size may be attached to the PTO interfaces. However, the pump gear shafts may have other angular arrangements in other examples.

FIG. 4 shows a cross-sectional view of the PTO assembly 240. The first pump adapter 278, the third pump adapter 304, the idler shaft 256, the idler gear 246, the bearing 258, the first pump gear 248, the pump gear shaft 268 with the internal spline 301, the pump gear shaft 284, the pump 281, the pump 285, the bearings 270, and one of the flanges 283 are again shown. Further, the second pump gear 400 is depicted which meshes with the idler gear 246. The second pump gear 400 is fixedly coupled to the pump gear shaft 308. Bearings 404 are coupled to the pump gear shaft 308 and a pump gear shaft 415. Bearings 404 are coupled to opposing axial sides of the second pump gear 400. A third hydraulic pump 406 that includes a shaft 408 which mates with splines 410 in the pump gear shaft 308 is further illustrated in FIG. 4. A pump adapter 414 with the pump gear shaft 415 that receives a shaft 416 of a pump 418 is further depicted in FIG. 4.

At least a portion of the pump adapters 278, 286, 304, and 414 may have unequal sizes. In this way, hydraulic pumps of different sizes may be attached to the PTO assembly, if desired. However, the pump adapters may have similar sizes, in other examples.

The driveline systems described above with regard to FIGS. 1-4 may be operated to transfer mechanical power from the output interface of the torque converter to the PTO assembly. This transfer of mechanical power may include transferring mechanical power to an interface of the first pump shaft interface that is designed to rotationally attach to a first hydraulic pump. This transfer of mechanical power may additionally include transferring mechanical power to an interface on a second pump shaft interface that is designed to rotationally attach to a second hydraulic pump. It will be appreciated that the previously described controller may be used to operate the prime mover to drive rotation of the torque converter and the PTO assembly.

FIG. 2-4 are drawn approximately to scale aside from the schematically depicted components. However, the driveline components may have other relative dimensions, in other embodiments.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. The invention will be further described in the following paragraphs. In one aspect, a driveline system is provided that comprises a hydraulic coupling designed to rotationally couple to a prime mover and including an output interface designed to rotationally couple to a downstream driveline component; and a power take-off (PTO) assembly comprising: a first pump gear rotationally coupled to an input gear that is directly coupled to the output interface, wherein the first pump gear is designed to rotationally couple to a first pump via a first pump shaft interface; and a first pump adapter designed to mount to the first pump.

In another aspect, a method for operation of a driveline system is provided that comprises transferring mechanical power from an output interface of a torque converter to a power take-off (PTO) assembly; wherein the PTO assembly comprises: an input gear directly coupled to the output interface and rotationally coupled to a first pump gear that is directly coupled to a first pump shaft interface; and a housing at least partially enclosing the torque converter and the input gear; wherein the first pump shaft interface is designed to rotationally couple to a first pump.

In yet another aspect, a power take-off (PTO) assembly is provided that comprises an input gear directly coupled to an output interface of a torque converter; an idler gear meshing with the input gear and a first pump gear, wherein the first pump gear is designed to rotationally couple to a first pump via a first pump shaft interface; a first pump adapter designed to mount to an enclosure of the first pump; and a housing at least partially enclosing the input gear and an impeller and a turbine in the torque converter; wherein the idler gear is coupled to an idler shaft that is supported by the housing.

In any of the aspects or combinations of the aspects, the PTO assembly may further comprise: a second pump gear that is designed to rotationally couple to the first gear and rotationally couple to a second pump via a second pump shaft interface; and a second pump adapter designed to mount to the second pump.

In any of the aspects or combinations of the aspects, the idler gear may be coupled to an idler shaft via a bearing and wherein the idler shaft is supported by a housing on opposing axial sides and wherein the bearing is a tapered roller bearing.

In any of the aspects or combinations of the aspects, a portion of the first pump adapter may axially overlap a section of the hydraulic coupling that includes an impeller and/or a turbine.

In any of the aspects or combinations of the aspects, the driveline system may further comprise a housing enclosing at least a portion of the PTO assembly and the hydraulic coupling and the housing encloses a lock-up clutch of the hydraulic coupling.

In any of the aspects or combinations of the aspects, the prime mover may be an internal combustion engine, the hydraulic coupling is a torque converter, and the downstream driveline component is an automatic transmission.

In another aspect, a method is provided that includes transferring mechanical power from an output interface of a torque converter to a power take-off (PTO) assembly; wherein the PTO assembly comprises: a first gear directly coupled to the output interface and rotationally coupled to a first pump gear that is directly coupled to a first pump shaft interface; and a housing at least partially enclosing the torque converter and the first gear; wherein the first pump shaft interface is designed to rotationally couple to a first pump.

In any of the aspects or combinations of the aspects, transferring the mechanical power between the output interface and the PTO assembly may include transferring mechanical power to an interface of the first pump shaft interface that is designed to rotationally attach to a first hydraulic pump.

In any of the aspects or combinations of the aspects, transferring the mechanical power between the output interface and the PTO assembly may include transferring mechanical power to an interface on a second pump shaft interface that is designed to rotationally attach to a second hydraulic pump.

In any of the aspects or combinations of the aspects, the PTO assembly may further comprise an idler gear meshing with the first gear and the first pump gear and wherein the idler gear is coupled to an idler shaft via a bearing and wherein the idler shaft is supported by the housing on opposing axial sides.

In any of the aspects or combinations of the aspects, the first pump gear may include a third pump shaft interface and the second pump gear includes a fourth pump shaft interface and wherein the third and fourth pump shaft interfaces are designed to couple to pump shafts.

In another representation, a hydraulic power take-off (PTO) system is provided that comprises a PTO gear reduction including an input gear that co-rotates with an output of a torque converter, an idler gear that rotates on an idler shaft supported by a torque converter housing, and a pump gear that rotates on a hollow shaft which is profiled to mate with hydraulic pump shaft.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer-readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations, and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline system comprising:
  a hydraulic coupling configured to rotationally couple to a prime mover and including an output interface configured to rotationally couple to a downstream driveline component; and
  a power take-off (PTO) assembly comprising:
    a first pump gear rotationally coupled to an input gear that is directly coupled to the output interface, wherein the first pump gear is configured to rotationally couple to a first pump via a first pump shaft interface; and
a first pump adapter including at least one mounting flange configured to mount to the first pump,
wherein the at least one mounting flange axially overlaps a section of the hydraulic coupling that includes an impeller and/or a turbine.

2. The driveline system of claim 1, wherein the PTO assembly includes an idler gear meshing with the input gear and the first pump gear.

3. The driveline system of claim 2, wherein the PTO assembly further comprises:
a second pump gear that is configured to rotationally couple to the input gear and rotationally couple to a second pump via a second pump shaft interface; and
a second pump adapter configured to mount to the second pump, the second pump adapter and the first pump adapter having unequal sizes.

4. The driveline system of claim 2, wherein the idler gear is coupled to an idler shaft via a bearing, and wherein the idler shaft is supported by a housing on opposing axial sides.

5. The driveline system of claim 4, wherein the bearing is a tapered roller bearing.

6. The driveline system of claim 1, further comprising a housing enclosing at least a portion of the PTO assembly and the hydraulic coupling.

7. The driveline system of claim 6, wherein the housing encloses a lock-up clutch of the hydraulic coupling.

8. The driveline system of claim 1, wherein the prime mover is an internal combustion engine, the hydraulic coupling is a torque converter, and the downstream driveline component is an automatic transmission.

9. A method for operation of a driveline system, comprising:
transferring mechanical power from an output interface of a torque converter to a power take-off (PTO) assembly;
wherein the PTO assembly comprises:
an input gear directly coupled to the output interface and rotationally coupled to a first pump gear that is directly coupled to a first pump shaft interface;
a housing at least partially enclosing the torque converter and the input gear
wherein the first pump shaft interface is configured to rotationally couple to a first pump; and
a first pump adapter including at least one mounting flange configured to mount to the first pump,
wherein the at least one mounting flange axially overlaps a section of the housing that includes the torque converter.

10. The method of claim 9, wherein transferring the mechanical power between the output interface and the PTO assembly includes transferring mechanical power to an interface of the first pump shaft interface that is configured to rotationally attach to a first hydraulic pump.

11. The method of claim 10, wherein transferring the mechanical power between the output interface and the PTO assembly includes transferring mechanical power to an interface on a second pump shaft interface that is configured to rotationally attach to a second hydraulic pump.

12. The method of claim 9, wherein the PTO assembly further comprises an idler gear meshing with the input gear and the first pump gear, wherein the idler gear is coupled to an idler shaft via a bearing, and wherein the idler shaft is supported by the housing on opposing axial sides.

13. A power take-off (PTO) assembly comprising:
an input gear directly coupled to an output interface of a torque converter;
an idler gear meshing with the input gear and a first pump gear, wherein the first pump gear is configured to rotationally couple to a first pump via a first pump shaft interface;
a first pump adapter including at least one mounting flange configured to mount to an enclosure of the first pump; and
a housing at least partially enclosing the input gear and an impeller and a turbine in the torque converter,
wherein the idler gear is coupled to an idler shaft that is supported by the housing, and wherein the at least one mounting flange axially overlaps a section of the housing.

14. The PTO assembly of claim 13, further comprising a second pump gear rotationally coupled to the input gear and configured to rotationally couple to a second pump via a second pump shaft interface.

15. The PTO assembly of claim 13, wherein the first pump adapter at least partially encloses the first pump gear.

16. The PTO assembly of claim 13, further comprising a second pump gear meshing with the idler gear, wherein the second pump gear is configured to rotationally couple to a second pump via a second pump shaft interface.

17. The PTO assembly of claim 16, wherein the first pump gear includes a third pump shaft interface and the second pump gear includes a fourth pump shaft interface, and wherein the third and fourth pump shaft interfaces are configured to couple to pump shafts.

18. The PTO assembly of claim 13, wherein the idler shaft is coupled to the housing via an attachment device, and wherein the idler gear is coupled to the idler shaft via a bearing.

19. The PTO assembly of claim 13, wherein the input gear and the first pump gear each have helical teeth or straight teeth.

* * * * *